Patented Oct. 14, 1924.

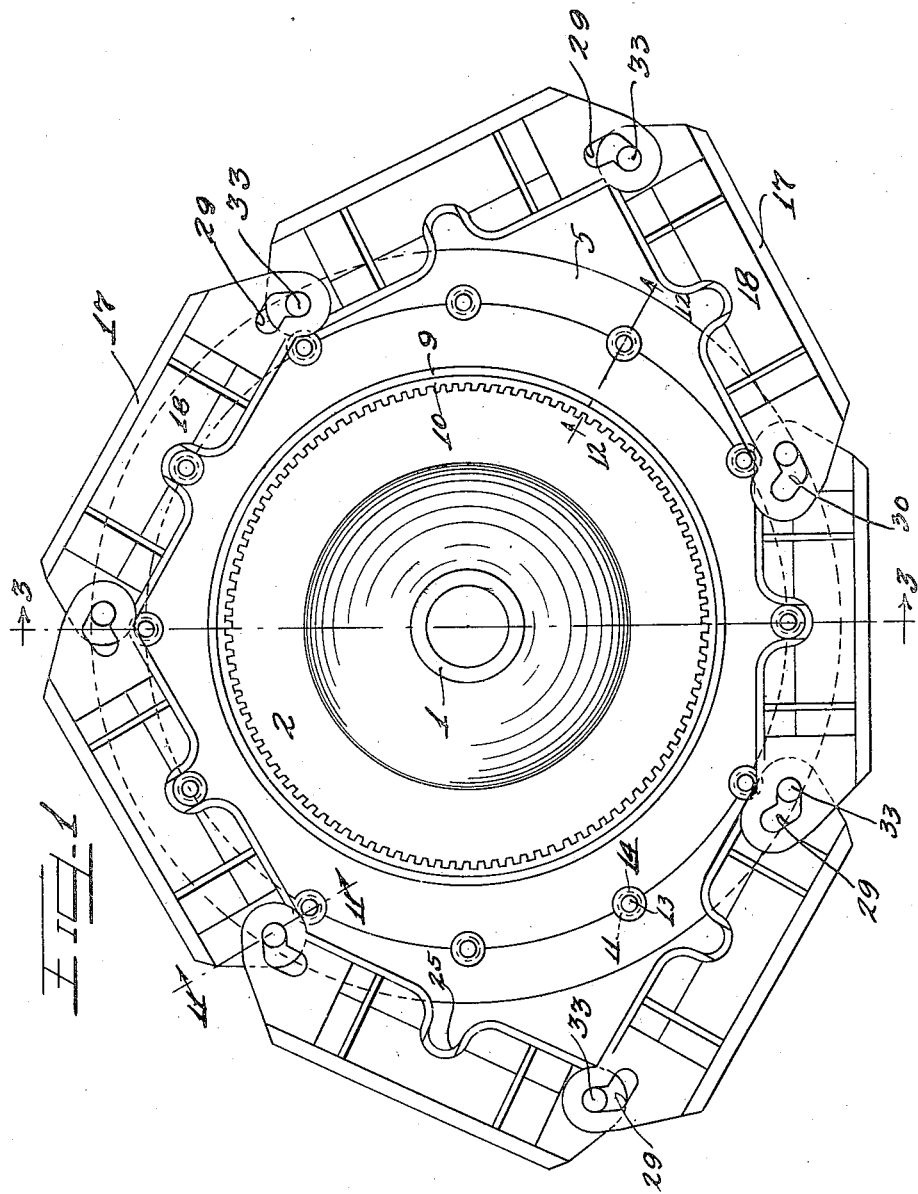

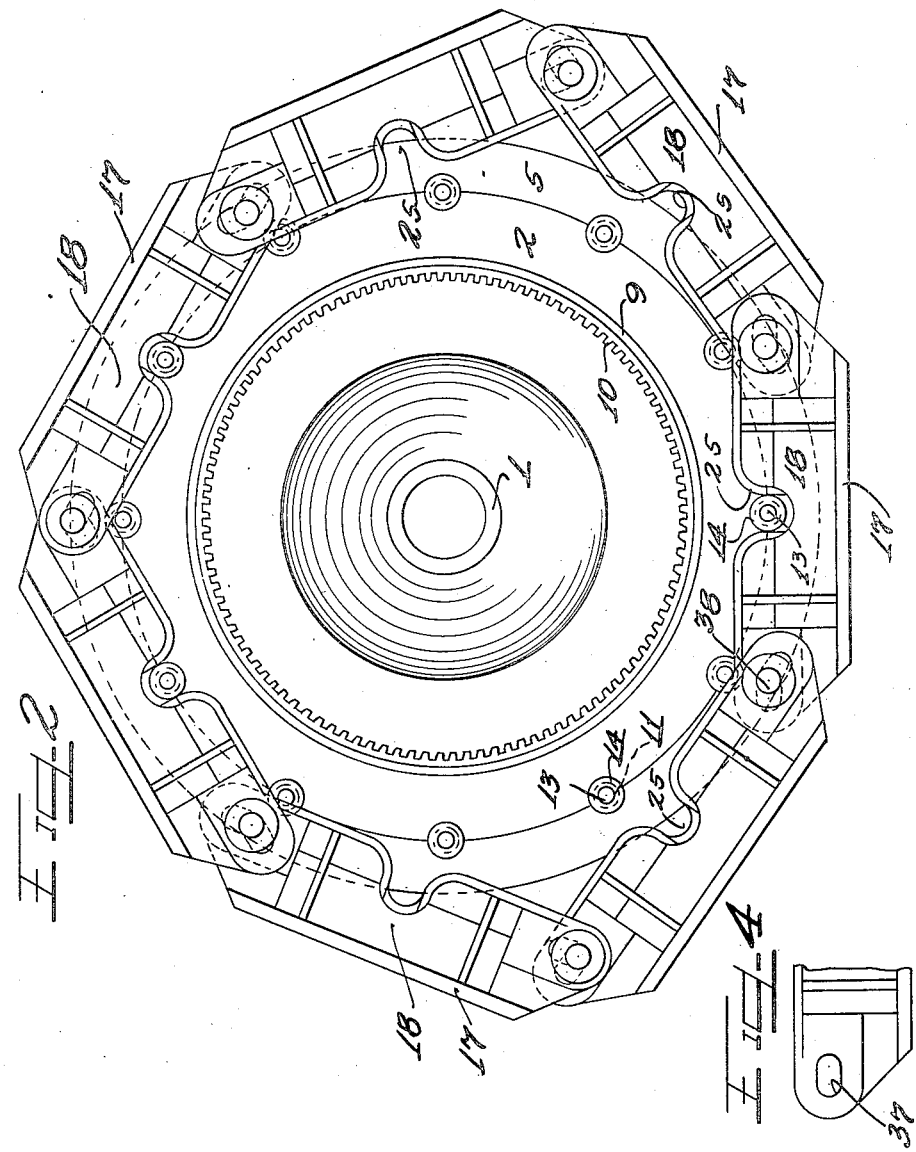

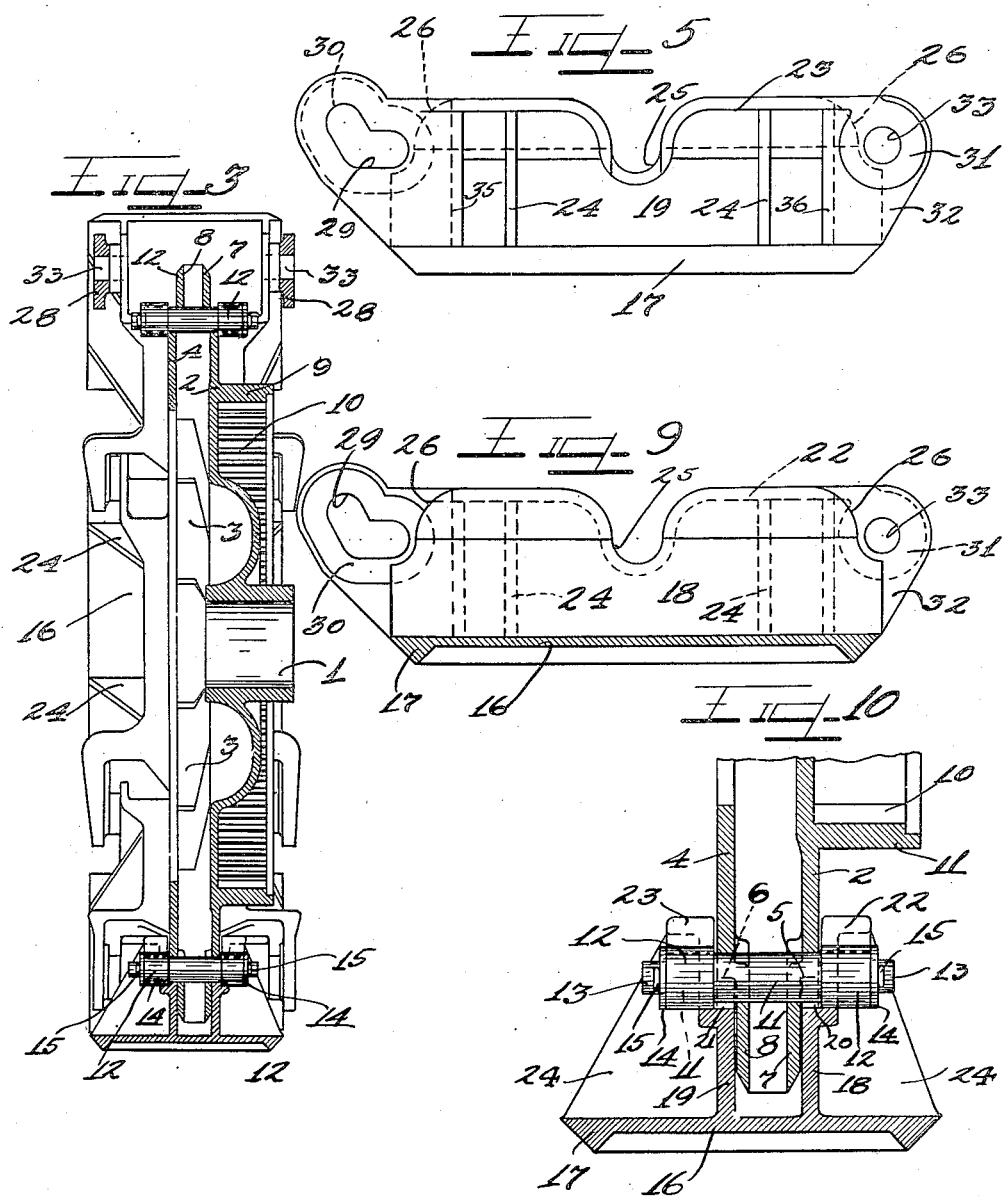

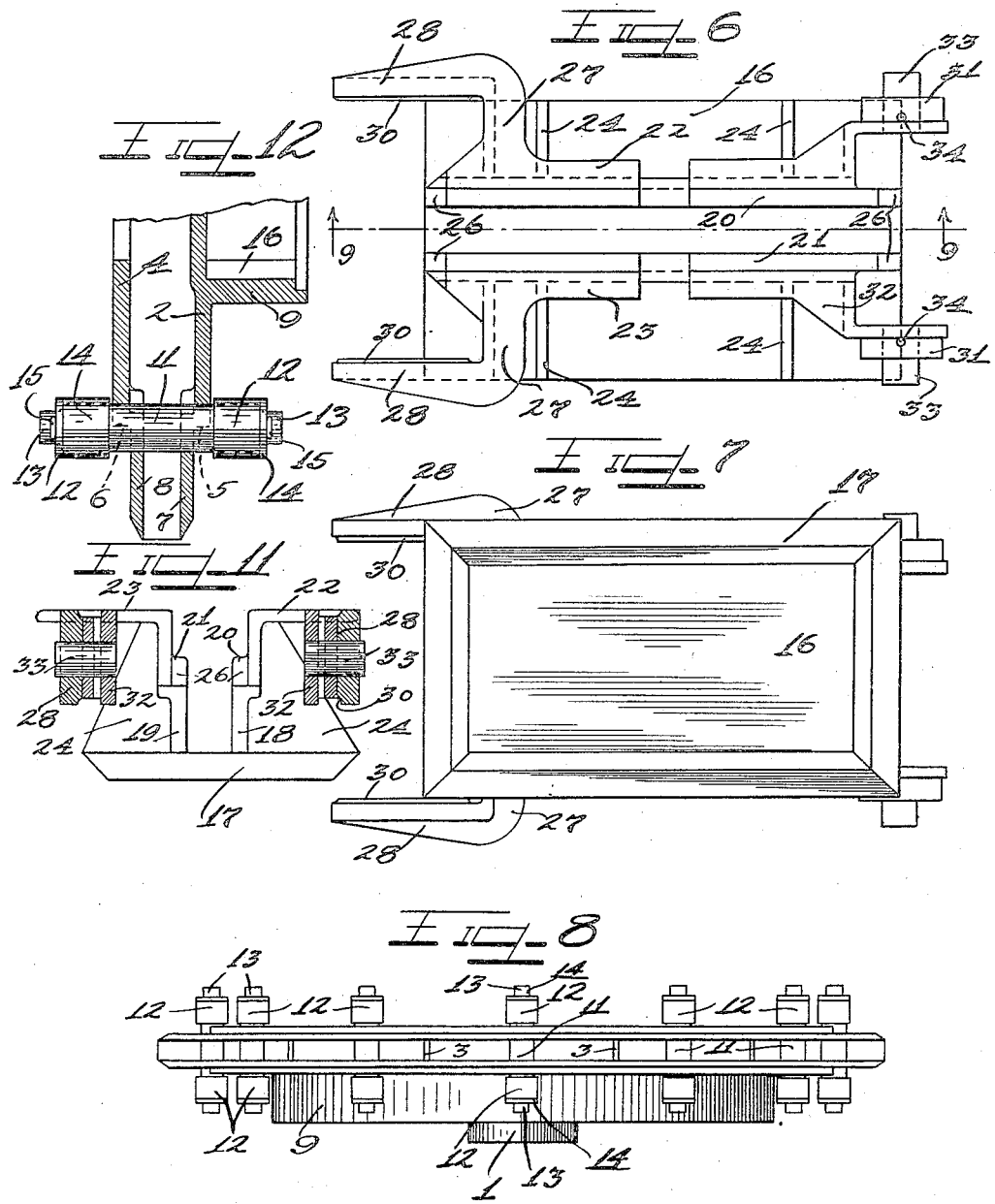

1,511,573

UNITED STATES PATENT OFFICE.

ROYAL R. MILLER, OF CHICAGO, ILLINOIS, ASSIGNOR TO MILLER TRACTION TREAD COMPANY, A CORPORATION OF DELAWARE.

TRACKLAYING TREAD-DRIVE WHEEL.

Application filed February 28, 1921. Serial No. 448,497.

*To all whom it may concern:*

Be it known that I, ROYAL R. MILLER, a citizen of the United States, and a resident of the city of Chicago, in the county of Cook and State of Illinois, have invented certain new and useful Improvements in a Tracklaying Tread-Drive Wheel; and I do hereby declare that the following is a full, clear, and exact description of the same, reference being had to the accompanying drawings, and to the numerals of reference marked thereon, which form a part of this specification.

This invention relates to a track laying tread drive wheel and embodies modifications of and improvements in the drive wheel disclosed in my copending application for patent, Serial No. 322,520 filed September 8th, 1919.

In drive wheels of this type a plurality of tread elements are carried on and positively driven by a single wheel, and it is necessary in order to effect an efficient drive to provide a properly designed lost motion connection between the tread members. It is also necessary to provide means on the driving and supporting wheel adapted to positively engage the tread elements to advance the same, and it is of course desirable that this engagement between the tread elements and the driving wheel be effected with a minimum of frictional loss and at the proper points to transmit a maximum driving force.

It is an object, therefore, of the present invention to provide a track laying tread drive wheel wherein tread elements engage means extending laterally from each side of a supporting and driving wheel.

It is another object of this invention to provide a track laying tread drive wheel wherein lateral extensions on a driving wheel are adapted to be successively engaged by depressed portions of tread elements which are supported on the wheel.

It is a further object of this invention to provide a track laying tread drive wheel wherein lateral extensions on a driving annulus are provided with anti-friction means adapted to be engaged in cutaway portions of tread elements in order that the same may be advanced by the driving annulus.

It is an important object of this invention to provide a track laying tread drive wheel wherein tread elements are positively driven from laterally extending means on a driving annulus, and wherein adjacent tread elements are provided with connecting means which allow sufficient relative movement of the same to maintain a true rolling relation between the tread elements, the driving annulus and the laterally extending means on said annulus.

Other and further important objects of this invention will be apparent from the disclosures in the specification and the accompanying drawings.

The invention (in a preferred form) is shown on the drawings and hereinafter more fully described.

On the drawings:

Figure 1 is a view in elevation of a track laying tread drive wheel embodying the principles of this invention.

Figure 2 is a similar view of the drive wheel of this invention showing the use of another form of connecting means for the tread element.

Figure 3 is a section on the line 3—3 of Figure 1.

Figure 4 is a fragmentary view in elevation showing a detail of the connecting means used with the wheel shown in Figure 2.

Figure 5 is a side elevation of one of the tread elements.

Figure 6 is a top plan view of one of the tread elements.

Figure 7 is a bottom plan view of one of the tread elements.

Figure 8 is a plan view of the driving wheel.

Figure 9 is a section on the line 9—9 of Figure 6.

Figure 10 is a fragmentary detail section slightly enlarged and taken on the line 3—3 of Figure 1.

Figure 11 is a section on the line 11—11 of Figure 1.

Figure 12 is a fragmentary section on the line 12—12 of Figure 1.

As shown on the drawings:

The track laying tread elements of the drive wheel of this invention are supported on a driving wheel or annulus which comprises a hub 1 whereby it may be pivotally mounted on the vehicle which is to be driven, and extending outwardly from said hub 1 is an annular plate 2 to which is attached by means of integral ribs 3 an annular plate 110

4, which is spaced from said annular plate 2 and in a plane parallel to the plane of said plate. Said annular plates 2 and 4 are bent inwardly toward each other to form shoulders 5 and 6 respectively, and from said shoulders 5 and 6 said plates again extend outwardly in parallel planes affording annular driving extensions 7 and 8 which act to properly position the tread elements in a manner which will be described hereinafter.

An inwardly extending integral flange 9 on the plate 2 is provided with internal gear teeth 10 which are adapted to be engaged with a driving pinion connected with a source of power on the vehicle on which the drive wheel is mounted. In order that the tread elements may be positively driven by the drive wheel, it is necessary that means for engaging said elements be provided on said wheel, and for this purpose a plurality of short shafts or pins 11 are provided extending through oppositely positioned apertures in the plates 2 and 4 and having rollers 12 mounted on each end thereof on the outside of said plates. The outer ends of said pins or shafts 11 are reduced at 13, and engaged on said reduced portions and abutting the rollers 12 are washers 14, which are secured in position on said reduced extensions 13 by means of cotter pins 15, and which consequently act to secure the rollers 12 in position on the outer ends of the shafts 11.

The tread elements of the track laying tread drive wheel of this invention each comprise a rectangular plate 16 which is provided with a rib 17 extending downwardly around the outer edge thereof to afford a firm engagement with the surface over which the drive wheel is travelling. Extending upwardly from the plate 16 are integral spaced longitudinal ribs 18 and 19, which are oppositely offset at their intermediate portions to afford longitudinal shoulders 20 and 21, and which are provided with outwardly extending integral flanges 22 and 23, respectively, extending along their upper edges. Lateral reinforcement of the plates 18 and 19 is effected by ribs 24 which are integral with said plates and with the plate 16 and extend downwardly and outwardly to the upper edge of said plate 16 as clearly shown in Figure 10. The shoulders 20 and 21 on the inside of the plates 18 and 19 engage the shoulders 5 and 6 on the plates 2 and 4, respectively, and in order that a drive may be imparted from the driving wheel to the tread elements said plates 18 and 19 and the flanges 22 and 23 thereon are cut away to afford a central transverse depression or recess 25, which is adapted to be engaged over the rollers 12. This cutaway portion is clearly shown in Figures 5 and 9 and is of a proper shape to effect a smooth gear driving action between said rollers and the tread elements, and in order that said rollers may be engaged between abutting ends of adjacent tread elements, the plates 18 and 19 at said abutting ends are cut away as shown at 26 to afford depressions between the ends of adjacent tread elements similar to the depressions 25 in the tread elements.

Means are provided for connecting the tread elements together with a lost motion connection in such a manner that they are maintained in a true rolling relation with the rollers 12 on the lateral driving pins 11 and so that the shoulders 20 and 21 thereon are maintained in a true rolling relation with the shoulders 5 and 6 on the annular plates 2 and 4. For this purpose integral lateral extensions 27 extend outwardly from the flanges 22 and 23 on one end of the plates 18 and 19, and integral with said extensions are longitudinal extensions 28 in which oppositely positioned cam-shaped or angular slots 29 are formed. Facings or reinforcing portions 30 are formed on the inside of the extensions 28 surrounding said slots 29, and said facings 30 are adapted to engage the outer faces of bosses 31 which are supported on the opposite end of an adjacent tread member in a manner which will now be described. Said bosses 31 are supported on spaced extensions 32 of the plates 18 and 19, and secured by means of a pin 34 centrally in each of said bosses is a pin or stub shaft 33, which is engaged through the slot 29 in the extension 28 of an adjacent tread member, and consequently said pins, which are movable in said slots 29, act to connect the tread elements together with a lost motion connection, which, on account of the peculiar form of the slots so restrains the movement of the tread members that a true rolling relation between the same and the driving rollers 12 and the shoulders 20 and 21 and the shoulders 5 and 6 is maintained. Said extending portions 27 and 32 are preferably reinforced by integral lateral ribs 35 and 36 respectively, as clearly shown in Figure 5.

A different form of end connection which may be employed in the track laying tread drive wheel of this invention is shown in Figures 2 and 4. This connection is of the general type described in my copending application for patent, Serial No. 322,520, and comprises the provision of longitudinal slots 37 in the extensions on the ends of the tread members and the connection of said tread members by the engagement of pins 38 through the slots in the extensions in adjacent tread members. Since said pins 38 are movable in each of the slots through which they are engaged, it is apparent that the adjacent tread members will be maintained in the proper relative position to insure a true rolling relation between the driving rollers 12 and the depressions in the tread members and between the shoulders 20 and 21 on the plates 18 and 19 and the shoulders 5 and 6 on the plates 2 and 4.

The operation is as follows:

The track laying tread elements are engaged over the extensions 7 and 8 of the plates 2 and 4 of the driving annulus so that the shoulders 20 and 21 thereon engage the shoulders 5 and 6 on the plates 2 and 4, and so that the rollers 12 are successively engaged in the depressions 25 and in the depressions formed between the tread elements by the cutaway portions 26. On account of the lost motion connection between the tread elements, which is afforded by the movement of the pins 33 in the cam slots 29, or by the movement of the pins 38 in the slots 37, said tread elements are allowed to move the proper distance relative to each other and in the proper direction to insure a true rolling relation between the contacting shoulders and between the rollers 12 and the depressions in the tread elements. Consequently the tread elements are positively driven and properly supported on the driving annulus, and as the same is rotated the tread elements are successively brought into flat contact with the surface over which the vehicle on which the drive wheels are mounted is travelling, and, on account of the large area of said tread elements in contact with said surface, the traction of the vehicle is increased and the progress thereof over soft, muddy ground is greatly facilitated. Since said rollers 12 are mounted adjacent the shoulders 20 and 21 and engaged in depressions formed in said shoulders, it is apparent that a gear drive is in effect provided and the tread elements are supported and driven from points "substantially coincident with the pitch line of the driving gears." The construction of the drive wheel is strong and simple, and the rollers 14 and the pins 11, as well as the connecting pins 33 or 38, may be conveniently replaced when worn.

I am aware that numerous details of construction may be varied through a wide range without departing from the principles of this invention, and I therefore do not purpose limiting the patent granted otherwise than necessitated by the prior art.

I claim as my invention:

1. A track laying tread drive wheel comprising an annulus, lateral projections on the annulus, a plurality of connected tread elements engaging said annulus and the lateral projections thereon and means on the tread elements engaging the annulus in a plane substantially coincident with the center line of said lateral projections.

2. A track laying tread drive wheel comprising an annulus having its outer edge reduced to afford a co-axial annular shoulder, connected tread elements engaged over the reduced portion of the annulus and adapted to roll on the shoulder thereon, and means projecting laterally from the annulus and engaging the tread elements to transmit a positive drive to the same.

3. A track laying tread drive wheel comprising an annulus having its outer edge reduced to afford a co-axial annular shoulder, spaced apertures in the annulus at said shoulders, tread elements engaged over the reduced portion of the annulus and adapted to roll on the shoulder, and means engaged through the apertures in the annulus and projecting laterally from each side thereof to engage the tread elements and transmit a positive drive to the same.

4. A track laying tread drive wheel comprising an annulus, a co-axial annular shoulder formed on the annulus, tread elements engaged over the annulus and adapted to roll on the shoulder, depressions formed in the tread elements, and means projecting laterally from the annulus and engaged in said depressions to transmit a positive drive to the tread elements.

5. A track laying tread drive wheel comprising an annulus, a co-axial annular shoulder formed on the outside of the annulus, tread elements engaged over the annulus and adapted to roll on the shoulder, means projecting laterally from the annulus and engaging the tread elements to transmit a positive drive to the same, and means for connecting the tread elements with a lost motion connection whereby the same are maintained in a true rolling relation with the shoulder on the annulus and with the lateral projections.

6. The combination with a wheel, of a tread supporting structure secured thereto, said structure being reduced adjacent its periphery and having laterally extending rolling elements upon both sides, and a series of connected tread elements surrounding said reduced portion of said supporting structure, and having depressions for engaging said rolling elements and means for cooperating with said reduced portions.

7. The combination with a wheel, of a tread supporting structure secured thereto and having lateral tracks and rolling elements projecting from both lateral sides thereof, and a connected series of tread elements surrounding said supporting structure in engagement with said tracks and rolling elements.

In testimony whereof I have hereunto subscribed my name in the presence of two subscribing witnesses.

ROYAL R. MILLER.

Witnesses:
CARLTON HILL,
JAMES M. O'BRIEN.